(12) United States Patent
Maharyta et al.

(10) Patent No.: US 11,467,693 B1
(45) Date of Patent: Oct. 11, 2022

(54) IMPEDANCE SENSING METHODS

(71) Applicant: Cypress Semiconductor Corporation, San Jose, CA (US)

(72) Inventors: Andriy Maharyta, Lviv (UA); Hans Klein, Pleasanton, CA (US); Oleksandr Karpin, Lviv (UA); Roman Ogirko, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/396,326

(22) Filed: Aug. 6, 2021

(51) Int. Cl.
*G06F 3/041* (2006.01)
*G06F 3/044* (2006.01)
*G06F 3/045* (2006.01)

(52) U.S. Cl.
CPC .......... *G06F 3/04166* (2019.05); *G06F 3/044* (2013.01); *G06F 3/045* (2013.01); *G06F 2203/04106* (2013.01)

(58) Field of Classification Search
CPC ...... G06F 3/044; G06F 3/045; G06F 3/04166; G06F 3/041662; G06F 3/0418; G06F 2203/04106
See application file for complete search history.

(56) References Cited

U.S. PATENT DOCUMENTS

| | | | | |
|---|---|---|---|---|
| 5,057,839 A * | 10/1991 | Koch | ...................... | H03M 3/47 341/172 |
| 6,970,126 B1 * | 11/2005 | O'Dowd | ................. | H03M 3/34 341/172 |
| 7,683,641 B2 * | 3/2010 | Hargreaves | ........ | G01R 27/2605 324/686 |
| 8,089,289 B1 * | 1/2012 | Kremin | ..................... | G01D 5/24 324/678 |
| 8,436,263 B2 * | 5/2013 | Kremin | ................ | H03K 17/962 345/173 |
| 8,928,622 B2 * | 1/2015 | Wang | ..................... | G06F 3/0446 345/174 |
| 9,154,160 B2 * | 10/2015 | Kremin | ................ | G06F 3/04166 |
| 9,819,360 B1 * | 11/2017 | Maharyta | .............. | H03K 17/962 |
| 2008/0079444 A1 * | 4/2008 | Denison | .................... | G01D 5/24 324/679 |
| 2009/0208069 A1 * | 8/2009 | Chuang | .............. | G06V 40/1306 382/124 |
| 2012/0112947 A1 * | 5/2012 | Krauss | ..................... | H03M 1/60 341/172 |
| 2013/0314109 A1 * | 11/2013 | Kremin | .............. | H03K 17/9622 324/686 |
| 2015/0102951 A1 * | 4/2015 | Watanabe | .............. | H03M 3/458 341/143 |
| 2015/0145801 A1 * | 5/2015 | Angelini | ............... | G06F 3/0446 345/174 |

(Continued)

*Primary Examiner* — Michael Pervan (57) ABSTRACT

Apparatus and methods of impedance sensing are described. One method includes performing a first digital conversion of an attribute of a sensor electrode and performing a second digital conversion of the attribute of the sensor electrode. The second digital conversion differs by at least one characteristic from the first digital conversion. The method further includes calculating a resistance of the sensor electrode from a first and second digital value of the first and second digital conversions, respectively; and calculating a capacitance of the sensor electrode from the first and second digital value of the first and second digital conversions, respectively.

22 Claims, 8 Drawing Sheets

(56) References Cited

U.S. PATENT DOCUMENTS

| | | | |
|---|---|---|---|
| 2015/0338952 A1* | 11/2015 | Shahparnia | G06F 3/0443 |
| | | | 345/174 |
| 2016/0110020 A1* | 4/2016 | Lee | G06F 3/0445 |
| | | | 345/174 |
| 2017/0083146 A1* | 3/2017 | Yuan | G06F 3/04166 |
| 2018/0260076 A1* | 9/2018 | Maharyta | G06F 3/0446 |

* cited by examiner

IMPEDANCE SENSING METHODS

TECHNICAL FIELD

The present disclosure relates generally to sensing systems, and more particularly to capacitance-sensing systems configurable to measure self capacitance or convert self capacitance to digital values representative of the self capacitance.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Arrays of capacitive sense elements work by measuring the capacitance of a capacitive sense element, and looking for a delta (change) in capacitance indicating a touch or presence of a conductive object. When a conductive object (e.g., a finger, hand, or other object) comes into contact with or close proximity to a capacitive sense element, the capacitance changes and the conductive object is detected. The capacitance changes of the capacitive touch sense elements can be measured by an electrical circuit. The electrical circuit converts one or more attributes, such as the measured capacitances of the capacitive sense elements or the measured resistance of the sense elements, into digital values.

There are two typical types of capacitance: 1) mutual capacitance where the capacitance-sensing circuit has access to both electrodes of the capacitor; 2) self capacitance where the capacitance-sensing circuit has only access to one electrode of the capacitor where the second electrode is tied to a DC voltage level or is parasitically coupled to Earth Ground. A touch panel has a distributed load of capacitance of both types (1) and (2) and some touch solutions sense both capacitances either uniquely or in hybrid form with its various sense modes.

DETAILED DESCRIPTION

Sensing device requirements need to be robust and high performing while still being relatively cheap and consuming relatively low power. Sensing devices, such as multi-sense converters, can include impedance-sensing, capacitance-sensing, inductance-sensing, and voltage-sensing devices, and can convert a sensing signal manifested as a current into a digital code. In particular, there is a demand for reliable and efficient impedance sensing techniques in many areas, including automotive, internet of things (IoT), and general consumer fields. General consumer fields further include sensing capabilities applied to liquid properties; liquid level sensing; measurement of soil moisture; water pollution sensing in devices such as dishwashers, washing machines, etc.; water hardness in devices such as coffee machines; smart sensing in refrigerators; as many other fields. Thus, these markets among others can benefit from improved and low-cost impedance sensing techniques.

Conventional impedance sensing techniques, such as resistance-inductance-capacitance (RLC) techniques and impedance analyzers typically use sine wave signals to measure impedance components. For example, some of the methods for impedance sensing include a bridge method (e.g., a Wien bridge) or an oscilloscopic method. Such techniques are complex and expensive to implement. Further, conventional sense methods support only capacitive sensing. If a sensor's equivalent circuit is a serial or parallel resistance-capacitance (RC) circuit, contributions from resistance and capacitance cannot be separated. Therefore, there is a need for impedance sensing methods. Aspects of the present disclosure provide low-cost impedance sensing methods for both serial and parallel RC sensors using one or more of a two-frequency method or a double-sampling single-frequency method as described herein.

Figure 1:
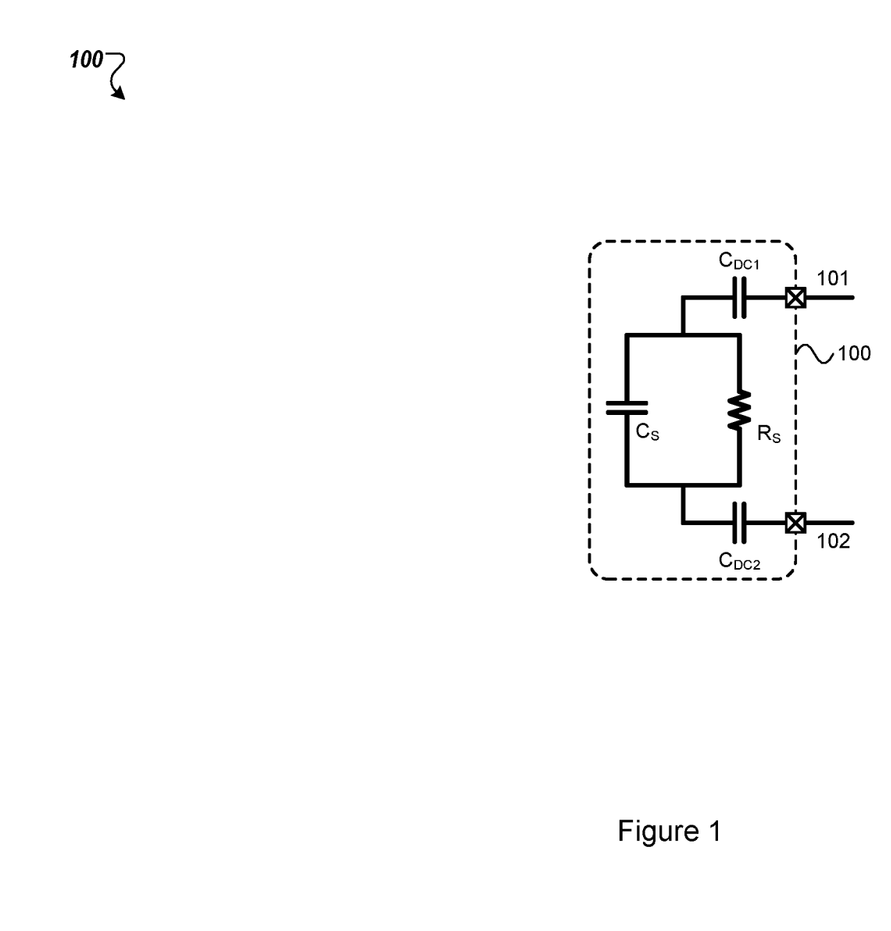
FIG. 1 illustrates an impedance sensor with a parallel resistance-capacitance (RC) architecture according to an embodiment.

FIG. 1 illustrates an impedance sensor 100 with a parallel RC architecture according to an embodiment. In particular impedance sensor 100 includes a sensor capacitance Cs and a sensor resistance Rs that are coupled in parallel. In some embodiments, impedance sensor 100 may be implemented with galvanic isolation. Impedance sensor 100 includes two direct current (DC) isolation capacitors: Cdc1 and Cdc2.

Figure 2:
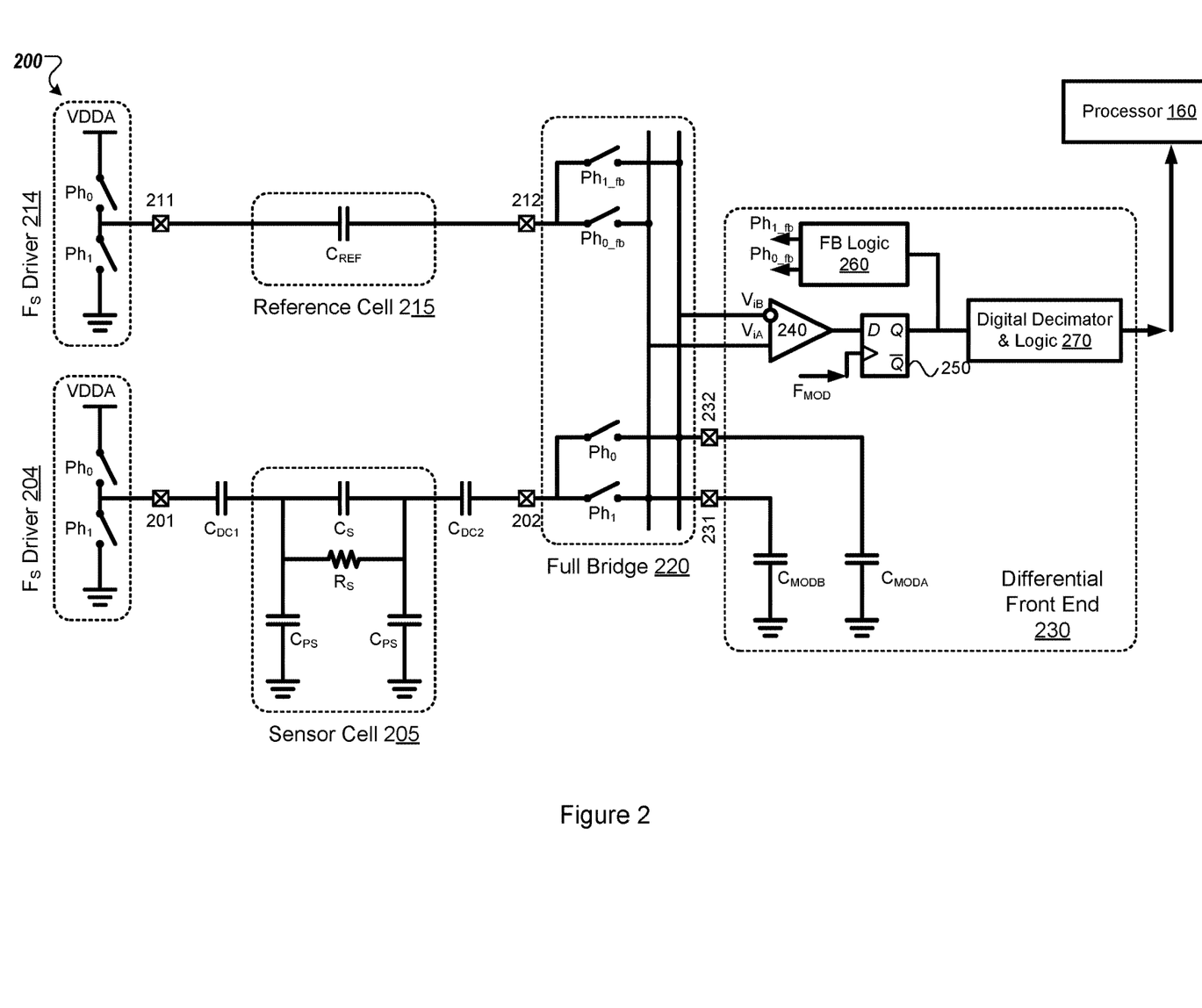
FIG. 2 illustrates a ratio-metric impedance measurement circuit with a sensor cell with a mutual capacitance and a reference cell with reference capacitance $C_{ref}$ according to an embodiment.

Impedance sensor 100 may be used as a sensor of a ratio-metric mutual-capacitance-to-(digital) code converter (CDC) for impedance measuring as described with respect to FIG. 2. More specifically, the CDC may be an impedance sensing circuit. In some embodiments, for certain applications, the sensor capacitance may have a capacitance value between 5 pico Farads (pF) and 100 pF, while the sensor resistance may have a resistance value between 50 Ohms (Ω) and 5 kilo Ohms (kΩ). However, the appropriate capacitance and resistance values depend on the specific construction of impedance sensor 100 and the corresponding applications. Therefore, in some embodiments, the sensor capacitance and the sensor resistance may have different values than the above-listed ranges.

Ratio-metric measurements depend on ratios of known values (e.g., ratios of capacitance values), rather than depending on DC voltage source values or the like. Ratio-metric capacitance-to-digital conversion can eliminate sources of error, such as common-mode noise. Further ratio-metric capacitance-to-digital conversion may be insensitive to clock frequencies, current sources, and supply and reference-voltage variations that support capacitance, inductance, resistance, voltage, and current measurements. Ratio-metric conversion can be achieved by conversion of attributes such as sensor resistance or capacitance to one or more digital values. Such digital values may be representative of duty cycles of a bit stream output by a modulator front end. Digital values between conversions may differ by i) sensor sampling frequency or ii) phase shifts of the sampling frequency, as described below.

FIG. 2 illustrates a ratio-metric impedance measurement circuit 200 with a sensor cell 205 with a mutual capacitance and a reference cell 215 with reference capacitance $C_{ref}$ according to an embodiment. In some embodiments, the capacitance of the reference cell includes direct current (DC) isolation capacitances. Sensor cell 205 has a sensor capacitance $C_{ref}$ and a sensor resistance $R_S$ (e.g., a sensor conductance $1/R_S$). Impedance measurement circuit 200 further includes a reference cell 215, a differential modulator front-end circuit 230 (or more simply referred to as a "front end" or a differential conversion circuit), a bridge circuit 220, and a processor 160. Bridge circuit 220 may be a full-bridge circuit. Bridge circuit may include a driver circuit coupled to a sensor electrode of the sensor cell 205 and another driver circuit coupled to the reference cell. The reference cell may be a part of a reference circuit. Modulator front-end circuit 230 (e.g., a conversion circuit) may be a sigma-delta modulator front-end circuit or another type of modulator.

Modulator circuit 230 may include a sequencer to sequence between phases of operation of impedance measurement circuit 200. The sequencer may sequence phases using a clock with a frequency Fmod. For example, impedance measurement circuit 200 may have phases Ph0 and Ph1 as well as corresponding feedback phases Ph0_fb and Ph1_fb. The feedback phases may be generated (e.g., enabled or disabled) by a feedback logic. The feedback logic may determine that the feedback phases are only enabled when the bit stream that is output by modulator front-end circuit 230 is high. During phase Ph0, a first electrode of reference cell 215 may be coupled to a supply voltage VDDA via a terminal 211. A first electrode of sensor cell 205 may also be coupled to the supply voltage via a terminal 201. A second electrode of sensor cell 205 may be coupled to a first modulation capacitor with capacitance CMODA via terminals 202 and 232 to charge the first modulation capacitor. If the phase Ph0_fb is enabled, a second electrode of reference cell 215 may be coupled to a second modulation capacitor with capacitance CMODB via terminals 212 and 231 to charge the second modulation capacitor. The first and second modulation capacitors may be part of an integrated circuit with comparator 240 and bridge circuit 220. An output of comparator 240 may be coupled to a digital decimator and logic block 270. The output may be a differential output from modulator circuit 230. The output may be from reference cell 215 and sensor cell 205.

During phase Ph1, the first electrodes of reference cell 215 and sensor cell 205 may be coupled a ground potential. The second electrode of sensor cell 205 may be coupled to the second modulation capacitor. If the phase Ph1_fb is enabled, the second electrode of reference cell 215 may be coupled to the first modulation capacitors. Both the first and second modulation capacitors may then be at least partially discharged.

Modulator circuit 230 may include a comparator 240. Bridge circuit 220 may be coupled to sensor cell 205, reference cell 215, as well as inputs of comparator 240. Inputs of comparator 240 are coupled to the first modulation capacitor and the second modulation capacitor and have a voltage ViA and ViB respectively. Modulator circuit 230 may provide digital values for a bit stream that is output by comparator 240 of modulator circuit 230. Processor 160 receives the digital values and calculates an impedance of an electrode of sensor cell 205.

A transfer function of impedance measurement circuit 200 can be expressed (as a first approximation in terms of $C_S$):

$$D_x = \frac{1}{C_{ref}} \cdot C_s + \frac{T_{ex}}{2 \cdot C_{ref}} \cdot \frac{1}{R_s} \qquad (1)$$

where $D_x$ refers to the duty cycle of the bit stream, $C_{ref}$ refers to the capacitance of the reference capacitor, and $T_{ex}$ is a half period of the sensor-excitation signal.

The impedance can be measured by taking two scans at different modulation clocking frequencies and changing one variable that will affect one of either the sensor conductance or the sensor resistance. More generally, two scans can be taken, with each scan differing from the other by a certain characteristic (frequency, phase, duration, periodicity, etc.). The measurement result for each scan is directly proportional to the sensor capacitance and the sensor conductance. Each of the two scans result in a different duty cycle, $D_{x1}$ and $D_{x2}$ resulting in a system of two equations that can be solved for the sensor capacitance or the sensor resistance. For example, in one embodiment, a difference between the duty cycles can be used to obtain either the sensor capacitance or the sensor resistance. In other embodiments, other operations, such as a sum, a ratio, a product, of the duty cycles can be used to obtain the sensor capacitance or resistance.

Figure 3A:
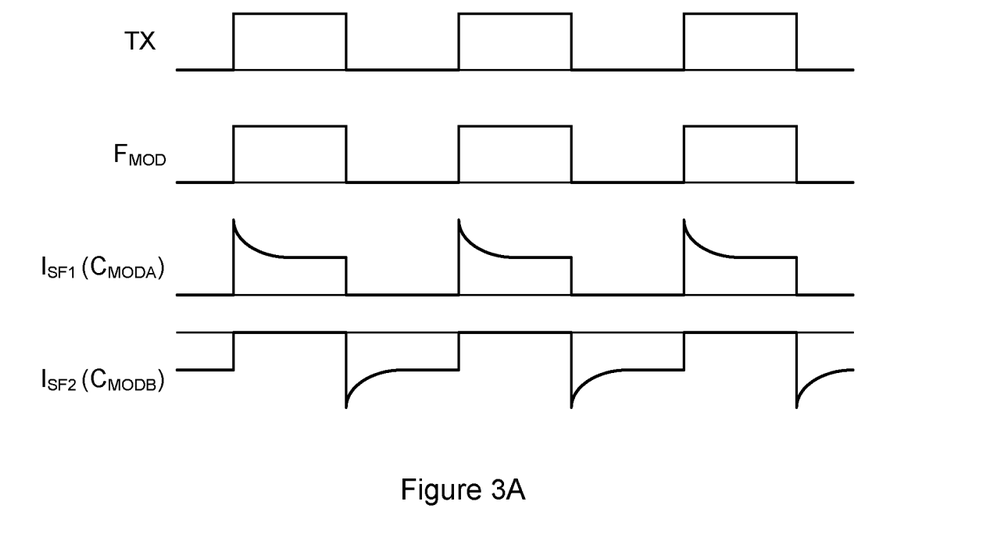
FIG. 3A shows from top to bottom: the period of the sensor-excitation signal, the modulation clocking frequency, a current signal $I_{SF1}$ on the first modulation capacitor, and a current signal $I_{SF2}$ on the second modulation capacitor at a first sensor-excitation frequency Fs1 according to an embodiment.

FIG. 3A shows from top to bottom: the period of the sensor-excitation signal, the modulation clocking frequency, a current signal $I_{SF1}$ on the first modulation capacitor, and a current signal $I_{SF2}$ on the second modulation capacitor at a first sensor-excitation frequency Fs1 according to an embodiment.

Figure 3B:
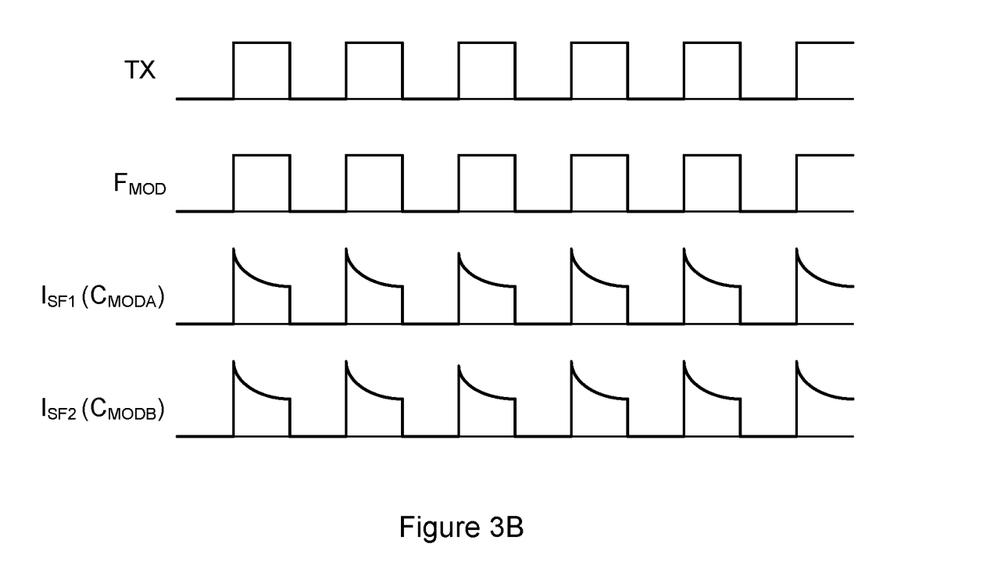
FIG. 3B shows from top to bottom: the period of the sensor-excitation signal, the modulation clocking frequency, a current signal $I_{SF1}$ on the first modulation capacitor, and a current signal $I_{SF2}$ on the second modulation capacitor at a first sensor-excitation frequency Fs2 according to an embodiment.

FIG. 3B shows from top to bottom: the period of the sensor-excitation signal, the modulation clocking frequency, a current signal $I_{SF1}$ on the first modulation capacitor, and a current signal $I_{SF2}$ on the second modulation capacitor at a first sensor-excitation frequency Fs2 according to an embodiment. It should be noted that Fs2 is different than Fs1. Fs1 and Fs2 may be representative of drive signals that are provided to the sensor electrode of sensor cell 205. For example, for illustrative purposes, in the embodiment depicted by FIGS. 3A-3B, Fs1=6 MHz while Fs2=8 MHz. However, other frequency values may be used for the two scans. The first measurement may correspond to a first drive signal which has the first frequency and the second measurement may correspond to a second drive signal which has the second frequency.

In one embodiment, (referring back to FIG. 2), reference cell 215 includes a reference capacitance Cref. In this case, the first duty cycle $D_{x1}$ (for the first measurement at the first sensor-excitation frequency) and the second duty cycle $D_{x2}$ (for the second measurement at the second sensor-excitation frequency) can be expressed respectively, using Equation (1) as:

$$D_{x1} = \frac{1}{C_{ref}} \cdot C_s + \frac{T_{ex}}{2 \cdot C_{ref}} \cdot \frac{1}{R_s} \tag{2}$$

$$D_{x2} = \frac{1}{C_{ref}} \cdot C_s + \frac{K_{fd} \cdot T_{ex}}{2 \cdot C_{ref}} \cdot \frac{1}{R_s} \tag{3}$$

where $K_{fd}$ is a coefficient (factor) that reflects the relation between the two values of $T_{ex}$. In other words, $$T_{ex1} = \frac{T_{ex2}}{K_{fd}}$$

where $T_{ex1}$ and $T_{ex2}$ are the half periods of the sensor-excitation signals for the first and second excitation signals respectively. By solving the system of equations given by Equations (2) and (3), the sensor capacitance and the sensor resistance are:

$$C_s = C_{ref} \cdot \left( \frac{K_{fd}}{K_{fd}-1} D_{x1} - \frac{1}{K_{fd}-1} D_{x2} \right) \text{ and} \tag{4}$$

$$R_s = \frac{1}{2 \cdot C_{ref}} \cdot \left( \frac{T_{ex} \cdot (K_{fd}-1)}{D_{x2} - D_{x1}} \right). \tag{5}$$

As is evident by Equation (4), in this described method for which reference cell 215 has a reference capacitance $C_{ref}$, the sensor capacitance $C_S$ does not depend on $T_{ex}$. In particular, this implies that the measurement of the impedance capacitance (e.g., the sensor capacitance of sensor cell 205) does not depend on the sensor excitation frequency. In other words, the sensor capacitance $C_S$ does not depend on $T_{ex}$ and thus does not depend on Fs1 or Fs2. The above-described measurement, referred to as a two-frequency capacitance-reference measurement, depends only on the reference capacitance $C_{ref}$ and the relationship coefficient $K_{fd}$ between the two sensor-excitation frequencies. On the other hand, the impedance resistance $R_S$ depends on $T_{ex}$ and may therefore be sensitive to variation and tolerances of $T_{ex}$.

Figure 4:
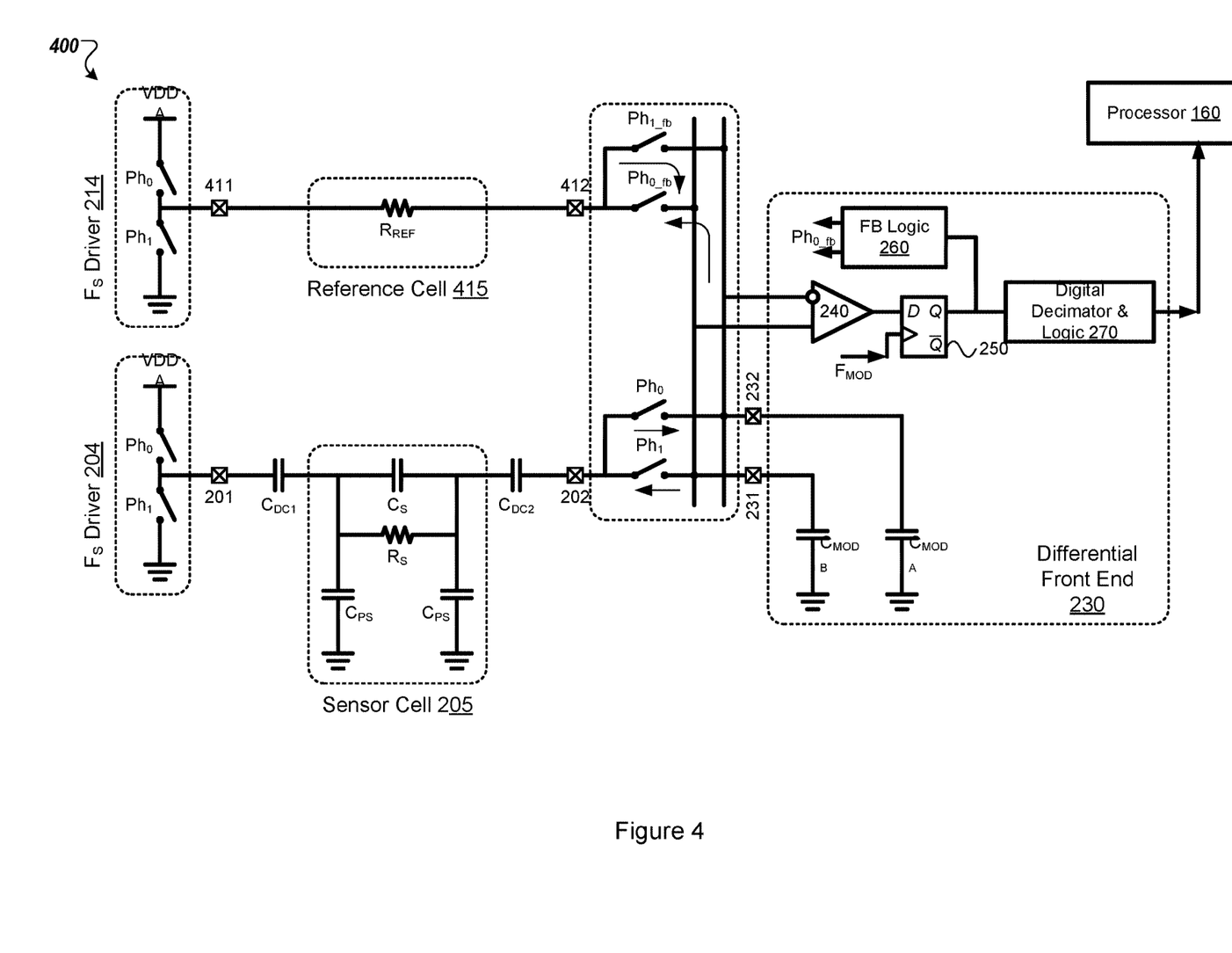
FIG. 4 illustrates a ratio-metric impedance measurement circuit with a sensor cell with a mutual capacitance and a reference cell with reference resistance $R_{ref}$ according to an embodiment.

FIG. 4 illustrates a ratio-metric impedance measurement circuit 400 with a sensor cell 205 with a mutual capacitance and a reference cell 415 with reference resistance $R_{ref}$ according to an embodiment. Impedance measurement circuit 400 is the same as impedance measurement circuit 200 except that the reference cell is characterized by a reference resistance rather than a reference capacitance. The architecture of impedance measurement circuit 400 provides a way to obtain an impedance measurement for which the reference resistance $R_{ref}$ is independent of $T_{ex}$. Such a method may be referred to as a two-frequency resistance-reference measurement.

Reference cell 415 may be coupled to one of the supply voltage VDDA (in the Ph0 phase) or the ground potential (in the Ph1) phase via a terminal 411. Reference cell 415 may be coupled to one of the first modulation capacitor with capacitance $C_{MODA}$ (in the Ph1 phase) or the second modulation capacitor with capacitance $C_{MODB}$ (in the Ph0 phase) via a terminal 412.

Applying the same technique as described above, by obtaining two duty-cycle measurements ($D_{x1}$ and $D_{x2}$) for different sensor-excitation frequencies and solving the system of equations, the sensor capacitance and the sensor resistance can be expressed:

$$C_s = \frac{1}{2 \cdot R_{ref}} \cdot \left( \frac{T_{ex} \cdot K_{fd} \cdot (D_{x2} - D_{x1})}{1 - K_{fd}} \right) \tag{6}$$

$$R_s = R_{ref} \cdot \frac{(1 - K_{fd})}{D_{x1} - K_{fd} \cdot D_{x2}} \tag{7}$$

where each term is as described above and $R_{ref}$ is the reference resistance.

As is evident by Equation (6), in this described method for which reference cell 215 has a reference resistance $R_{ref}$, the sensor resistance $R_S$ does not depend on $T_{ex}$. In particular, this implies that the measurement of the impedance resistance (e.g., the sensor resistance of sensor cell 205) does not depend on the sensor excitation frequency. In other words, the sensor resistance $R_S$ does not depend on $T_{ex}$ and thus does not depend on Fs1 or Fs2. The above-described measurement, referred to as a two-frequency reference-resistance measurement, depends only on the reference resistance $R_{ref}$ and the relationship coefficient $K_{fd}$ between the two sensor-excitation frequencies. On the other hand, the impedance capacitance $C_S$ depends on $T_{ex}$ and may therefore be sensitive to variation and tolerances of $T_{ex}$. It is worth noting that the reference resistance may include routing resistances, meaning it may have dependence on inherent resistance, (e.g., due to switches, wires, and the like). Such effects can be included in the calculation of the reference resistance, as used in Equations (6) and (7) as:

$$R_{ref\_real} = R_{ref} + \Sigma R_{swi} \tag{8}$$

where $R_{swi}$ represents contributions from each inherent resistance sources.

Alternatively, rather than making two measurements at different sensor-excitation frequencies as described above, the impedance can be measured by taking two scans at a single sensor-excitation frequency, but with different phase shifts between the $T_x$ signal and the demodulation signal and solving the resulting system of equations, while still implementing architectures of impedance measurement circuit 200 or impedance measurement circuit 400. For example, in some embodiments, in-phase and quadrature (IQ) shifts may be applied. In other embodiments, different phase shifts (such as π/4, π, etc.) between the two frequencies may be applied for the two measurements. For illustrative purposes, in the embodiment depicted by FIGS. 5A-5B, Fs1=6 MHz a 90 degree (90°) phase shift is applied.

Figure 5A:
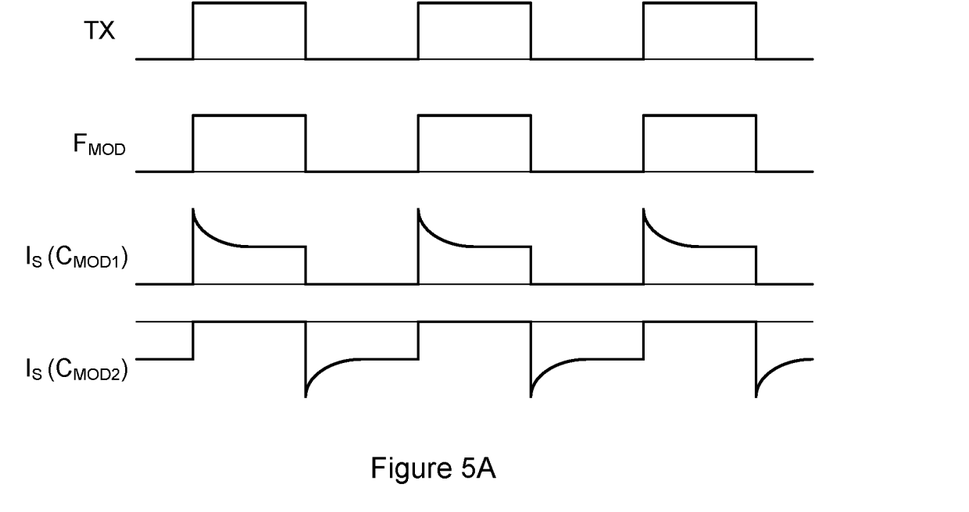
FIG. 5A shows from top to bottom: the period of the sensor-excitation signal, the modulation clocking frequency, a current signal $I_S$ on the first modulation capacitor, and a current signal $I_S$ on the second modulation capacitor with a zero phase shift between the $T_x$ signal and the demodulation signal according to an embodiment.

FIG. 5A shows from top to bottom: the period of the sensor-excitation signal, the modulation clocking frequency, a current signal $I_S$ on the first modulation capacitor, and a current signal $I_S$ on the second modulation capacitor with a zero phase shift between the $T_x$ signal and the demodulation signal according to an embodiment. $T_x$ and $F_{MOD}$ are in phase.

Figure 5B:
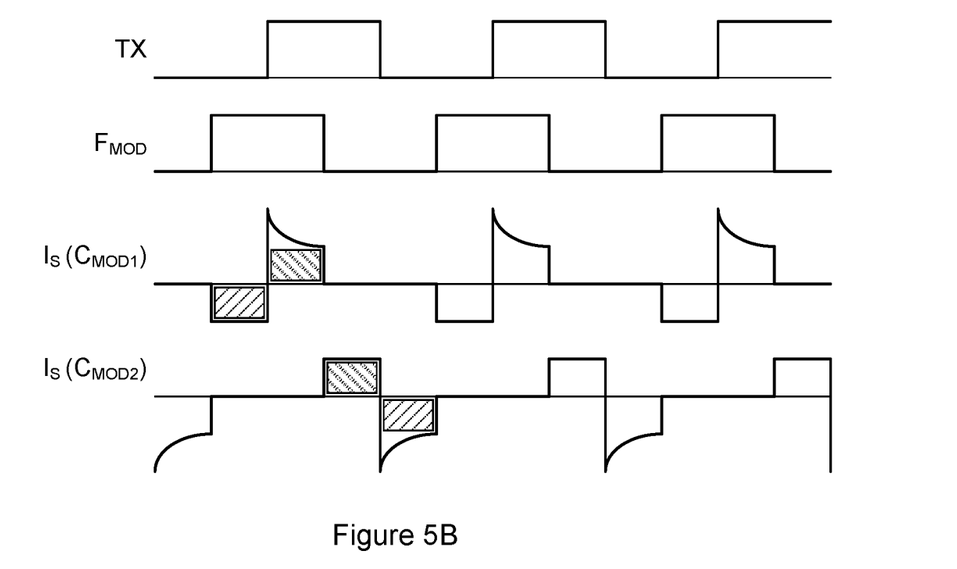
FIG. 5B shows from top to bottom: the period of the sensor-excitation signal, the modulation clocking frequency, a current signal $I_S$ on the first modulation capacitor, and a current signal $I_S$ on the second modulation capacitor with a 90° phase shift between the $T_x$ signal and the demodulation signal according to an embodiment.

FIG. 5B shows from top to bottom: the period of the sensor-excitation signal, the modulation clocking frequency, a current signal $I_S$ on the first modulation capacitor, and a current signal $I_S$ on the second modulation capacitor with a 90° phase shift between the $T_x$ signal and the demodulation signal according to an embodiment. $T_x$ and $F_{MOD}$ are out of phase. In an ideal case (when the phase shift is exactly 90°), an average input current of a demodulator (e.g., for IQ demodulation) is defined only by the capacitance part ($C_S$) of the impedance measurement from sensor cell 205. By comparing the two measurements ($D_{x0}$ for 0° and $D_{x90}$ for 90°), the sensor capacitance and the sensor resistance can be expressed:

$$C_S = C_{ref} D_{x90} \qquad (9)$$

$$R_s = \frac{T_{ex}}{4 \cdot C_{ref}} \cdot \frac{1}{D_{x90} - D_{x0}}. \qquad (10)$$

In some cases, the phase shift between $T_{ex}$ and $F_{mod}$ may not be exactly 90°. In these cases, the sensor capacitance and resistance can be expressed as:

$$C_s = \frac{C_{ref}}{2 \cdot (K_{90} - K_0)} \cdot (D_{x0} \cdot (2 \cdot K_{90} - 1) - D_{x90} \cdot (2 \cdot K_0 - 1)) \qquad (11)$$

$$R_s = \frac{T_{ex}}{2 \cdot C_{ref}} \cdot \frac{K_{90} - K_0}{D_{x90} - D_{x0}} \qquad (12)$$

where $K_0$ and $K_{90}$ are constants representing correction coefficients due to errors (e.g., parasitic parameters).

Figure 6:
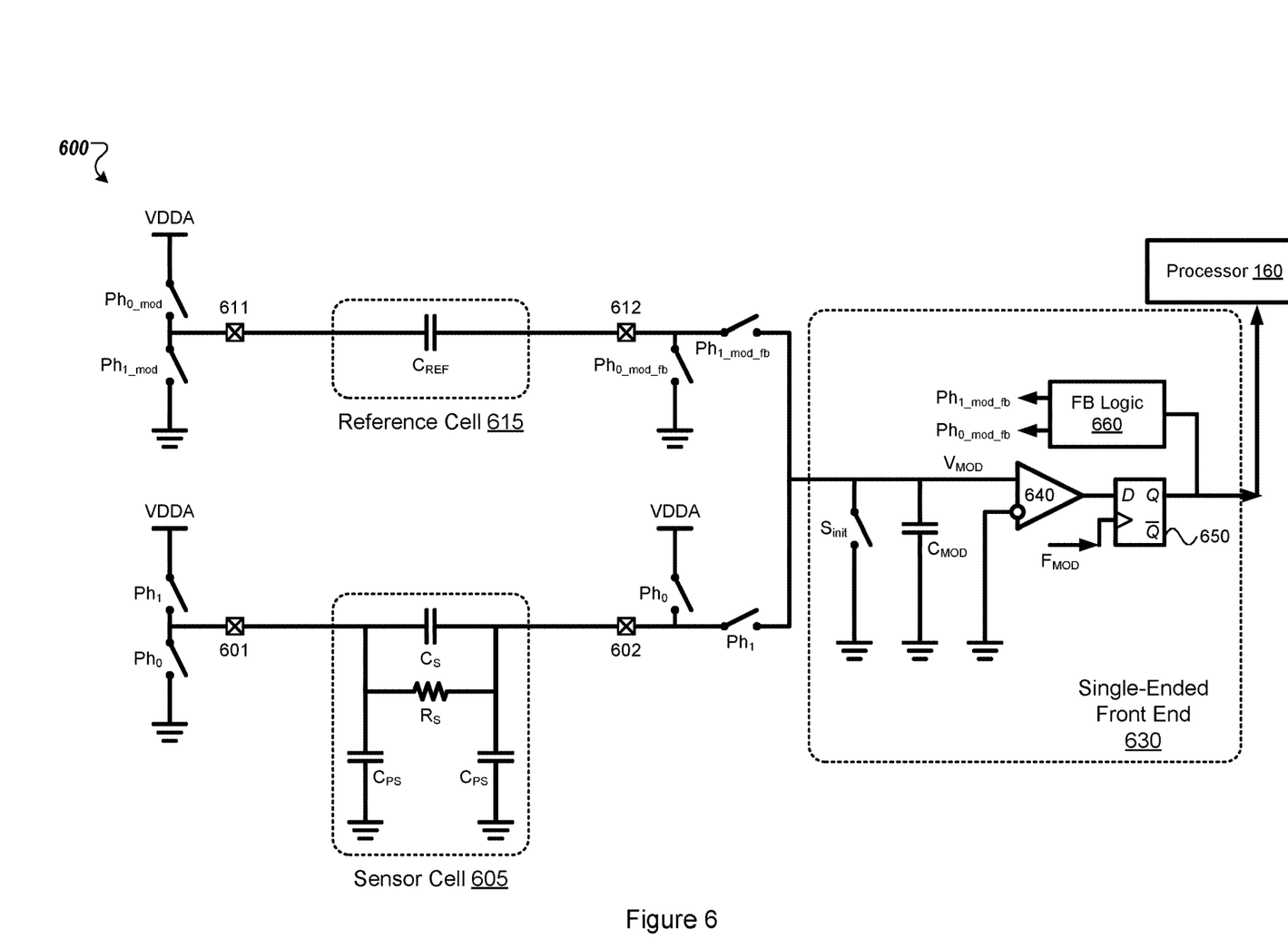
FIG. 6 illustrates a ratio-metric impedance measurement circuit with a single-ended modulator front-end circuit according to an embodiment.

FIG. 6 illustrates a ratio-metric impedance measurement circuit 600 with a single-ended modulator front-end circuit 630 according to an embodiment. Impedance measurement circuit 200 of FIG. 2 can be altered such that the modulator circuit is single-ended rather than differential and similar techniques as described above can be applied to obtain the sensor capacitance and resistance. For impedance measurement circuit 600, modulator circuit 630 may include a sequencer to sequence between phases of operation of impedance measurement circuit 200. The sequencer may sequence phases using a clock with a frequency Fmod. For example impedance measurement circuit 600 may have phases Ph0 and Ph1; modulated phases Ph0_mod and Ph1_mode; modulated feedback phases Ph0_mod_fb and Ph1_mod_fb. Feedback logic may determine that the modulated feedback phases are only enabled when the bit stream that is output by modulator front-end circuit 630 is high. Modulator circuit 630 may include a comparator 640. A first input of the comparator may be coupled to an initialization switch Sinit and to a modulation capacitor. A second input of comparator may be constantly coupled to the ground potential.

During phase Ph0, a first electrode of sensor cell 605 may be coupled to the ground potential via a terminal 601 and a second electrode of sensor cell 605 may be coupled to the supply voltage VDDA via a terminal 602. During phase Ph1, the first electrode of sensor cell 605 may be coupled to the supply voltage via terminal 601 while the second electrode of sensor cell 605 may be coupled to the first input of comparator 640 via terminal 602. During modulated phases Ph0_mod and Ph1_mod, which may be sequenced at a greater frequency than the phases Ph0 and Ph1, a first electrode of reference cell 615 may be alternatingly coupled to the supply voltage and the ground potential respectively. Additionally during modulated feedback phases Ph0_mod_fb and Ph1_mod_fb a second electrode of reference cell 615 may be alternatingly coupled between the ground potential and the first input of comparator 640 respectively. The modulated feedback phases may only be enabled when the bit stream output by modulation circuit 630 is high (e.g., 1).

During phase Ph0, a first electrode of reference cell 615 may be coupled to a supply voltage VDDA via a terminal 611. A first electrode of sensor cell 610 may also be coupled to the supply voltage via a terminal 610. A second electrode of sensor cell 605 may be coupled to modulation capacitor Cmod with capacitance CMOD via terminals 602 to charge the modulation capacitor Cmod. If the phase Ph0_fb is enabled, a second electrode of reference cell 615 may be coupled modulation capacitor Cmod with capacitance CMOD via terminals 612 to charge the secnd modulation capacitor.

During phase Ph1, the first electrodes of reference cell 615 and sensor cell 605 may be coupled a ground potential. The second electrode of sensor cell 605 may be coupled to the modulation capacitor. If the phase Ph1_fb is enabled, the second electrode of reference cell 615 may be coupled to the modulation capacitors. The modulation capacitor may then be at least partially discharged.

Modulator circuit 630 may include a comparator 640. Bridge circuit 620 may be coupled to sensor cell 605, reference cell 615, as well as inputs of comparator 640. Inputs of comparator 640 have a voltage ViA and ViB. Modulator circuit 630 may provide digital values for a bit stream that is output by comparator 640 of modulator circuit 630. Processor 160 receives the digital values and calculates an impedance of an electrode of sensor cell 605.

Figure 7:
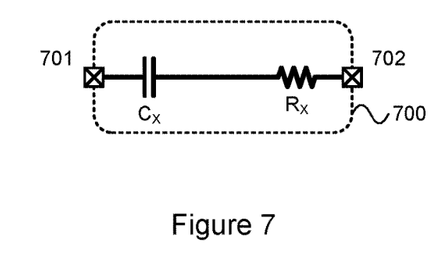
FIG. 7 illustrates an impedance sensor with a serial RC architecture according to an embodiment.

FIG. 7 illustrates an impedance sensor 700 with a serial RC architecture according to an embodiment. In particular impedance sensor 700 includes a sensor capacitance Cx and a sensor resistance Rx that are coupled in series. Impedance sensor 700 may be useful for applications such as measurement of liquid (such as water) levels and/or quality, differentiating between deionized water and conductive liquid, liquid salinity, film thickness of liquid, etc. Impedance sensor 700 may be implemented in place of sensor cells 205 of FIG. 4 and sensor cell 605 of FIG. 6. The sensor capacitance and the sensor resistance of impedance sensor 700 may then be calculated in a similar way by taking two measurements. In this particular case however, as impedance sensor 700 does not have a resonant frequency, but rather are characterized by a time constant, the two scans are designed to have a temporal difference, as illustrated in FIGS. 8A-8B.

Figure 8A:
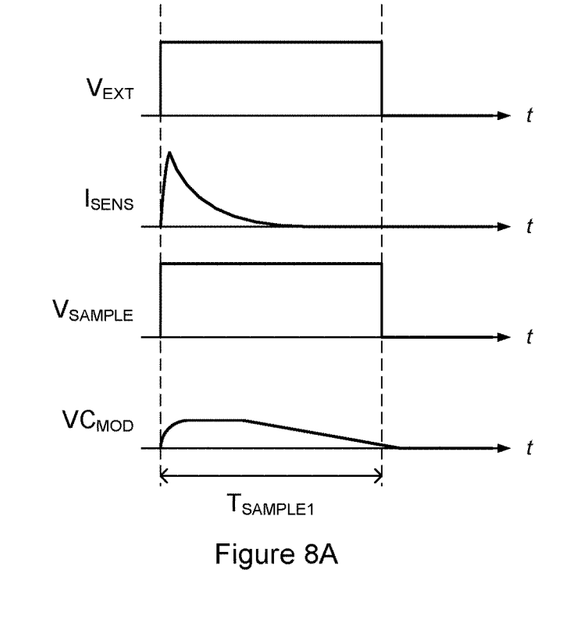
FIG. 8A shows from top to bottom: an external voltage $V_{EXT}$, a measured current $I_{sens}$, a sample voltage $V_{SAMpLE}$, and $VC_{MOD}$ according to an embodiment.

FIG. 8A shows from top to bottom: an external voltage $V_{EXT}$, a measured current $I_{sens}$, a sample voltage $V_{SAMPLE}$, and $VC_{MOD}$ according to an embodiment. The sample voltage may be applied for a duration of time $T_{SAMPLE1}$ that defines a time during which a measurement of a decay of $I_{sens}$ and/or $VC_{MOD}$ can be measured.

Figure 8B:
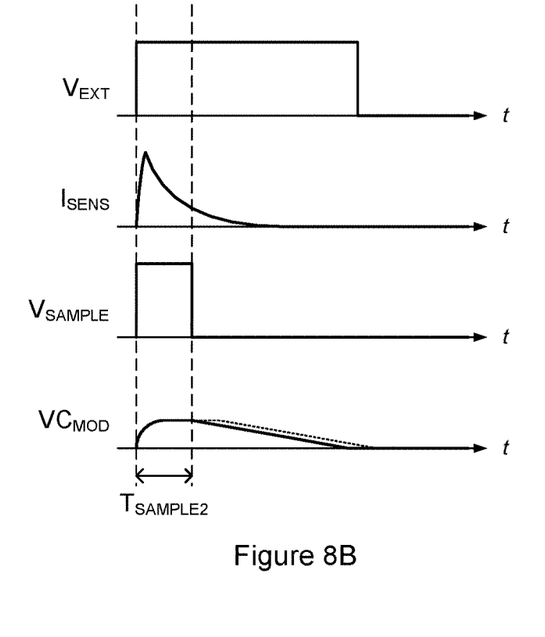
FIG. 8B shows from top to bottom: an external voltage $V_{EXT}$, a measured current $I_{sens}$, a sample voltage $V_{SAMPLE}$, and $VC_{MOD}$ according to an embodiment.

FIG. 8B shows from top to bottom: an external voltage $V_{EXT}$, a measured current $I_{sens}$, a sample voltage $V_{SAMPLE}$, and $VC_{MOD}$ according to an embodiment. In this cases, the duration of time is $T_{SAMPLE2}$ that defines a time during which a measurement of a decay of $I_{sens}$ and/or $VC_{MOD}$ can be measured.

In general, the measured current can be characterized by an exponential decay and expressed as $$I_{sens} = \frac{V_{ext}}{R_x} \cdot e^{-\frac{1}{R_x \cdot C_x} \cdot t} \quad (13)$$

where $R_x C_x$ represents a time constant of the decay, and the measured current depends on t (for the two measurements, either $T_{SAMPLE1}$ or $T_{SAMPLE2}$).

Further, in general, the charge of the capacitor with capacitance $C_x$ (e.g., the charge transfer) as a function of time is expressed:

$$Q_{sens} = V_{ext_{pp}} \cdot C_x \cdot \left(1 - e^{-\frac{1}{R_x \cdot C_x} \cdot t}\right) \quad (14)$$

For a first measurement in the case for which the sensor capacitor is fully discharged between each measurement (when $t > 3 \cdot R_x \cdot C_x$)

$$Q_{sens\_max} \approx V_{ext_{pp}} \cdot C_x \quad (15)$$

and therefore the sensing capacitance at the beginning of the first measurement can be rewritten as:

$$C_x \approx \frac{Q_{sens\_max}}{V_{ext_{pp}}} \quad (16)$$

and subsequently the sensor resistance can be expressed as:

$$R_x = -\frac{1}{C_x \cdot \ln\left(1 - \frac{Q_{sens}}{V_{ext_{pp}} \cdot C_x}\right)} \cdot t \quad (17)$$

It is worth noting that in general $t > \alpha \cdot R_x \cdot C_x$, where $\alpha$ can be any value where the exponential term $$e^{-\frac{1}{R_x \cdot C_x} \cdot t}$$

becomes negligible. In some embodiments $\alpha < 3$ while in other embodiments, $\alpha > 3$.

Equation (17) requires the second measurement (with $t = T_{SAMPLE2}$) to be solved. As with the case of the first measurement, the sensor capacitor with the sensor capacitance should be fully discharged before the measurement can be taken. If $T_{SAMPLE}$ represents the periodicity of a the measurements, then the sensor resistance can be approximated by $$R_x \approx -\frac{V_{ext_{pp}}}{Q_{sens} \cdot \ln\left(\frac{Q_{sens} - Q_{sens\_max}}{Q_{sens\_max}}\right)} \cdot T_{sample}. \quad (18)$$

In other words, two measurements with a sensor clocking frequency $F_S$ that satisfies $$F_s \leq \frac{1}{6 \cdot R_{x\_max} \cdot C_{x\_max}} \quad (19)$$

can be done. During the first measurement, the impedance sensor 700 of FIG. 7 may be continuously connected for measurement (to the modulator circuit in phase Ph1), while during the second measurement, the impedance sensor 700 may be connected for measurement for a time ($T_{SAMPLE}$) that is shorter than the time constant at which the measured charge or current is in a stable state. The data from the first measurement and the second measurement are used to calculate the sensor capacitance $C_x$ and the sensor resistance $R_x$ can be used for two duty cycle measurements for an impedance measurement, as described above in relation to Equations (1)-(2).

Figure 9:
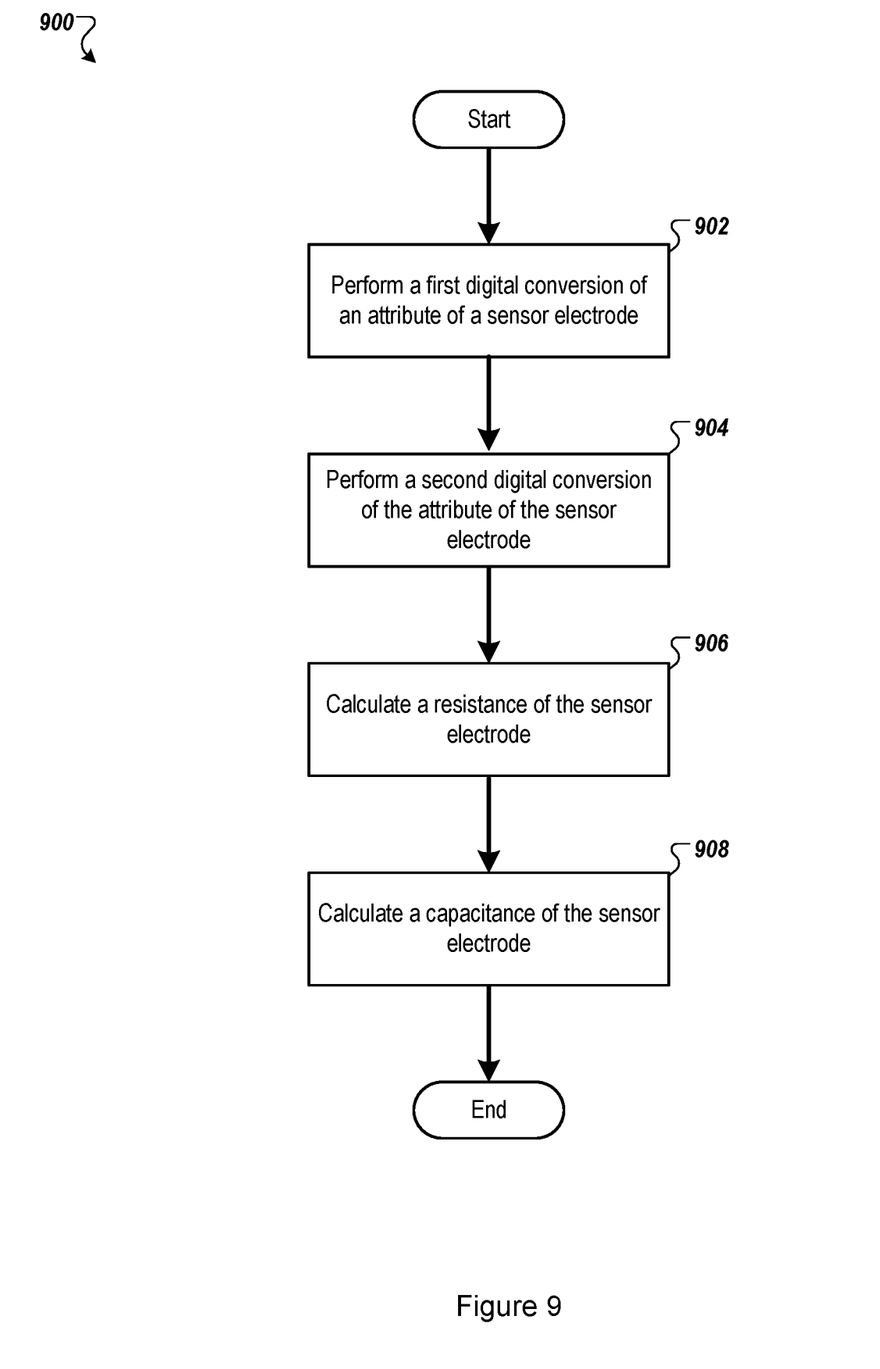
FIG. 9 is a flow diagram of one embodiment of a method 900 of impedance sensing according to an embodiment

FIG. 9 is a flow diagram of one embodiment of a method 900 of impedance sensing according to an embodiment. In some embodiments, processing logic may be used to perform the method 900. The processing logic may include hardware, software, or any combination thereof. In one embodiment, the processor (processing device) 160 of FIG. 2, 4, or 6 may perform the method 900. In other embodiments, impedance sensors 200, 400, or 600 may perform the method 900.

At block 902, the processing logic performs a first digital conversion of an attribute of a sensor electrode. At block 904, the processing logic performs a second digital conversion of an attribute of the sensor electrode. The second digital attribute differs by at least one characteristic from the first digital conversion. For example, the attribute could be a frequency of a drive signal that is provided to the sensor electrode, a phase of the drive signal that is provided to the sensor electrode, a duration of measurement of the sensor electrode, etc. For example, in the case that the attribute is the phase of the drive signal, the second digital conversion may be 90° out of phase with the first digital conversion. In other words, the attributes may be frequencies, phase shifts, etc. of the scanning signals, as described above in reference to a two-frequency method (with either capacitive or resistive reference) or a double-sampling sing-frequency method. At block 906, the processing logic calculates a resistance of the sensor electrode from a first digital value of the first digital conversion and a second digital value of the second digital conversion. The resistance of the sensor electrode may be referred to as a sensor resistance. At block 908, the processing logic calculates a capacitance of the sensor electrode from the first digital value and the second digital value. In some embodiments, the processing logic may perform steps in a different order. For example, in some embodiments, the processing logic may calculate a capacitance of the sensor electrode from the first digital value and the second digital value, and subsequently calculate the resistance of the sensor electrode from the first digital value and the second digital value.

The first and second digital values may be duty cycles of a bit stream from a modulator front-end circuit coupled to the sensor electrode of a sensor cell and to a reference cell.

In one embodiment, the reference cell can include a reference capacitance. In other embodiments, the reference cell can include a reference resistance. The reference resistance may include a routing resistance (e.g., resistance in the wires to and/or from the reference cell) of the reference cell.

The modulator front-end circuit may output a differential output from the reference cell and the sensor cell.

The embodiments described herein may be used in various designs of mutual-capacitance sensing arrays of the capacitance sensing system. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "calculating," "routing," "providing," "deriving," "obtaining," "receiving," "storing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    performing a first digital conversion of an attribute of a sensor electrode;
    performing a second digital conversion of the attribute of the sensor electrode, wherein the second digital conversion differs by at least one characteristic from the first digital conversion;
    calculating a resistance of the sensor electrode from a first and second digital value of the first and second digital conversions, respectively; and
    calculating a capacitance of the sensor electrode from the first and second digital value of the first and second digital conversions, respectively.

2. The method of claim 1, wherein the first and second digital values are duty cycles of a bit stream from a front end coupled to the sensor electrode and a reference cell.

3. The method of claim 2, wherein the reference cell comprises a reference capacitance.

4. The method of claim 2, wherein the reference cell comprises a reference resistance.

5. The method of claim 4, wherein the reference resistance comprises routing resistance of the reference cell.

6. The method of claim 2 further comprising, by the front end, providing a differential output from the reference cell and sensor cell.

7. The method of claim 1, wherein the at least one characteristic that differs between the first and second digital conversions is a frequency of a drive signal provided to the sensor electrode.

8. The method of claim 1, wherein the at least one characteristic that differs between the first and second digital conversions is a phase of a drive signal provided to the sensor electrode.

9. The method of claim 8, wherein the second digital conversion is 90-degrees out of phase with the first digital conversion.

10. An impedance measurement circuit comprising:
    a sensor cell, the sensor cell having a capacitance and a resistance;
    a reference cell,
    a differential conversion circuit for providing a digital value representative of a bit stream from an output of a comparator of the differential conversion circuit;
    a bridge circuit coupled to the sensor cell, the reference cell, and a first and second modulation capacitor, the bridge circuit further coupled to a first and second input of the comparator;
    a processor for receiving the digital value and for calculating an impedance of an electrode of the sensor cell from a plurality of digital values received by the processor.

11. The impedance measurement circuit of claim 10, wherein the differential conversion circuit is a differential sigma-delta modulator front-end circuit.

12. The impedance measurement circuit of claim 10, wherein a first digital value of the plurality of digital values corresponds to a first drive signal applied to the electrode, the first drive signal having a first frequency, and wherein a second digital value of the plurality of digital values corresponds to a second drive signal applied to the electrode, the second drive signal having a second frequency different than the first frequency.

13. The impedance measurement circuit of claim 10, wherein a first digital value of the plurality of digital values corresponds to a first drive signal applied to the electrode, the first drive signal having a first phase, and wherein a second digital value of the plurality of digital values corresponds to a second drive signal applied to the electrode, the second drive signal having a second phase different than the first phase.

14. The impedance measurement circuit of claim 10, wherein the reference cell comprises a capacitance.

15. The impedance measurement circuit of claim 10, wherein the reference cell comprises a resistance.

16. The impedance measurement circuit of claim 10, at least one of the first and second modulation capacitors are disposed on an integrated circuit with the comparator and bridge circuit.

17. The impedance measurement circuit of claim 10, wherein the capacitance of the reference cell comprises direct current (DC) isolation capacitances.

18. The impedance measurement circuit of claim 10, wherein the differential conversion circuit comprises the comparator coupled to the bridge circuit, feedback logic coupled to the output of the comparator, and a digital decimator and logic block coupled to the output of the comparator.

19. A system comprising:
    a sensor electrode;
    a reference circuit;
    first and second modulation capacitors, the sensor electrode, reference circuit and first and second modulation capacitors forming a full bridge circuit;
    a first driver circuit coupled to the sensor electrode;
    a second driver circuit coupled to the reference circuit;
    a differential front-end circuit including a comparator coupled to the full bridge circuit, the differential front-end circuit for converting an attribute of the sensor electrode to first and second digital values on first and second scans, respectively; and
    a processor for calculating a resistance and capacitance of the sensor electrode from the first and second digital values, wherein the first and second scans differ in at least one characteristic.

20. The system of claim 19, wherein the at least one characteristic that differs between the first and second scans is a frequency of a drive signal from the first and second driver circuits.

21. The system of claim 19, wherein the at least one characteristic that differs between the first and second scans is a phase of a drive signal from the first and second driver circuits.

22. The system of claim 21, wherein the phase of the drive signal from the first and second driver circuits is 90 degrees out of phase.

* * * * *